US008257594B2

(12) United States Patent  (10) Patent No.: US 8,257,594 B2
Astle et al.  (45) Date of Patent: Sep. 4, 2012

(54) TWIN TANK WATER-ON-WATER FILTRATION SYSTEM

(75) Inventors: Robert E. Astle, Middlefield, CT (US); Martin J. Blaze, Hamden, CT (US); Katrina Prutzman, Middletown, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 1073 days.

(21) Appl. No.: 12/027,377

(22) Filed: Feb. 7, 2008

(65) Prior Publication Data

US 2009/0200238 A1    Aug. 13, 2009

(51) Int. Cl.
*B01D 61/00* (2006.01)
*B01D 61/02* (2006.01)
*C02F 1/44* (2006.01)

(52) U.S. Cl. ............. 210/652; 210/195.1; 210/195.2; 210/257.1; 210/257.2; 210/321.6; 210/321.65; 210/416.1; 210/416.3; 210/739

(58) Field of Classification Search .............. None
See application file for complete search history.

(56) References Cited

U.S. PATENT DOCUMENTS

| | | | |
|---|---|---|---|
| 4,176,063 A | 11/1979 | Tyler | |
| 4,554,939 A | 11/1985 | Kern et al. | |
| 4,623,467 A * | 11/1986 | Hamlin | 210/652 |
| 4,695,375 A | 9/1987 | Tyler | |
| 4,705,625 A | 11/1987 | Hart, Jr. | |
| 4,776,952 A | 10/1988 | Burrows | |
| 4,895,654 A | 1/1990 | Burrows | |
| 4,909,934 A | 3/1990 | Brown et al. | |
| 5,060,824 A | 10/1991 | Credle, Jr. | |
| 5,181,631 A | 1/1993 | Credle, Jr. | |
| 5,254,243 A | 10/1993 | Carr et al. | |
| 5,366,159 A | 11/1994 | Childers | |
| 5,919,360 A | 7/1999 | Contaxis, III et al. | |
| 6,103,125 A * | 8/2000 | Kuepper | 210/637 |
| 6,110,360 A | 8/2000 | Hart, Jr. | |
| 6,764,595 B1 | 7/2004 | Halemba et al. | |
| 7,316,774 B2 | 1/2008 | Halemba et al. | |
| 7,550,084 B2 | 6/2009 | Schmitt | |
| 2004/0164022 A1* | 8/2004 | Solomon | 210/637 |
| 2005/0040087 A1 | 2/2005 | Jacuzzi | |
| 2007/0256977 A1 | 11/2007 | Schmitt | |
| 2009/0200238 A1 | 8/2009 | Astle et al. | |

FOREIGN PATENT DOCUMENTS

DE    1815446    10/1969

(Continued)

OTHER PUBLICATIONS

Written Opinion for PCT/US2009/031371, mailed Aug. 20, 2009.
Written Opinion for PCT/US2010/061482, mailed Apr. 12, 2011.
PCT International Search Report for PCT/US2010/061482, mailed Apr. 12, 2011.

(Continued)

*Primary Examiner* — Krishnan S Menon
*Assistant Examiner* — Dirk Bass (57) ABSTRACT

A water-on-water filtration system that includes a filter member and two storage vessels. The system includes a plurality of valves that are controlled to place a first of the storage vessels in a fill state in which the first storage vessel is being filled with filtered water, and concurrently place the second of the storage vessels in a service state in which filtered water held in the second storage vessel is delivered as an output of the filtration system. The filtration system can be configured to supply a constant output of filtered water to meet a constant demand while using a relatively small filter member and relatively small storage vessels.

14 Claims, 5 Drawing Sheets

FOREIGN PATENT DOCUMENTS

| | | |
|---|---|---|
| EP | 0098419 | 1/1984 |
| FR | 2240439 | 3/1975 |
| WO | 90/02702 | 3/1990 |
| WO | 93/10352 | 5/1993 |

OTHER PUBLICATIONS

PCT International Search Report for PCT/US2009/031371, mailed Aug. 20, 2009.

\* cited by examiner

TWIN TANK WATER-ON-WATER FILTRATION SYSTEM

TECHNICAL FIELD

The present disclosure generally relates to filtering systems and more particularly relates to fluid storage and flow control in filtering systems.

BACKGROUND

Water filtration systems designed for residential and commercial use have become increasingly popular. The popularity arises from the need to remove unwanted substances from input water to make output water safer for consumption in various end uses.

Two common water filtration systems are: 1) Systems that discharge product water into an enclosed pressure vessel against back pressure created by an air cell within the vessel (air-on-water system); and 2) Systems that discharge product water, in the absence of back pressure, into an enclosed pressure vessel and into a flexible water cell that can be compressed by a separate source of water to remove the product water from the vessel (water-on-water system).

Air-on-water systems are subject to the back pressure of the air cells which, essentially, reduces the pressure differential across the filtering portion of the system (e.g., a reverse osmosis membrane), thereby reducing the quality and quantity of filtered product water made in a given time. Product water quality particularly suffers if the product water is frequently drawn off and replaced in small quantities, as typically occurs in household systems that include a single filtering portion and a single storage vessel. Moreover, as the air cell-propelled water is emptied from the storage vessel, the air cell gradually loses pressure and the dispensing flow rate of the product water declines.

Most air cell systems include an automatic shut-off valve that stops feed water flow, and thus further production of slow flush waste water, when the storage tank is full and typically reaches 60%-70% of line pressure. This technique, while reducing waste, can result in reduced quantity and quality of the product water and its dispensing flow rate.

Water-on-water system can address many of the shortcomings of air-on-water system. Water-on-water system typically include a pressure vessel containing two water-filled compartments of approximately the same size. The physical separation between the compartments is movable or flexible so that water pressure in a first compartment influences the water pressure in the second compartment. Each compartment is accessed by different fluid sources so that one compartment can be filling while the other one is emptying. Thus, little or no pressure drop occurs across the compartments. Both compartments are pressurized, when product water is drawn out of the vessel. Both compartments are then depressurized when product water is filling one compartment and displacing water from the other compartment to drain.

SUMMARY

The present disclosure relates to water-on-water filtration systems. An example filtration system includes a filter member and two storage vessels. The system includes a plurality of valves that are controlled to provide filling of one of the storage vessels with filtered water (fill state) while filtered water held in the other storage vessel is delivered for use (service state). A filtration system with such an arrangement of storage vessels can be useful in supplying an output of filtered water to meet a constant demand while using a relatively small filter member and relatively small storage vessels.

The above summary is not intended to describe each disclosed embodiment or every implementation of the inventive aspects disclosed herein. Figures of the detailed description that follow more particularly describe features that are examples of how certain inventive aspects may be practiced. While certain embodiments are illustrated and described, it will be appreciated that the disclosure is not limited to such embodiments or arrangements.

DETAILED DESCRIPTION

Various embodiments will be described in detail with reference to the drawings, wherein like reference numbers represent like parts in assemblies throughout the several views. Reference to various embodiments does not limit the scope of the claims attached hereto. Additionally, any examples set forth in this specification are not intended to be limiting and merely set forth some of the many possible embodiments for the appended claims.

The following discussion is intended to provide a brief, general description of a suitable environment in which aspects of the invention may be implemented. Although not required, the invention will be described in the general context of a water filtration system, for example, a water-on-water reverse osmosis filtration system for residential and commercial uses. The structure, creation, and use of some example filtration systems and methods are described hereinafter.

The example embodiments disclosed herein have wide application to a number of filtration system applications beyond the applications emphasized herein. While such alternative applications and environments are possible, emphasis is placed on the application of features for a reverse osmosis filtration system, as that particular application is particularly benefited from the embodiments described herein with reference to the attached figures.

The examples disclosed herein are directed to a twin storage vessel, water-on-water filtration system. A water-on-water system utilizes potential energy in the form of feed pressure for water delivery, whereas typical systems utilize compressed air. One aspect of the disclosed examples is that there are two alternating delivery storage vessels. One of the vessels is in fill mode (also referred to as a fill state) while the other vessel is in a delivery mode (also referred to as a service state). This type of alternating vessel system provides the ability to make and store filtered water while the system is concurrently dispensing filtered water.

The ability to provide a constant or a near constant flow of filtered water, preferably at a predetermined supply pressure, is important for many applications such as in the food service industry. A result of using two storage vessels is that the filter member (e.g., a reverse osmosis filter) can operate at maximum capacity at a relatively constant rate. Thus, the size and related space requirements for the filter member of the examples disclosed herein can be significantly smaller as compared to other filtration systems that have the same or similar output capability. Further, the use of alternating storage vessels wherein one vessel is in a fill state while the other is in a service state can function with two tanks that have smaller space requirements, even when combined, than filtration systems with similar output capability. Thus, the overall size and related space requirements for a filtration system of a given output capability can be smaller than comparable single storage vessel filtration systems when implementing the features disclosed herein. A still further effect of using a dual storage vessel water-on-water system is the reduction of total dissolved solids (TDS) creep in the system because of the near constant flow of water across the filtering member and the relatively high pressure differential across the filtering member.

Water-on-water filtration systems have many advantages as compared to more commonly utilized water-on-air systems. One advantage of a water-on-water design is improved flow rate at the point of dispensing filtered water. In some instances, water-on-water systems can produce 1.5 to 3 times or greater the flow of typical air-on-water systems. Water-on-water systems can also provide improved delivery pressure at the point of dispense, typically on average of at least 2 times that of water-on-air systems. Improved delivery pressure can also provide increased production as the flow of water into and out of the storage vessel can increase as compared to water-on-air systems. In general, water-on-water systems also have improved efficiency in that they produce less waste water (water to drain) for every unit of filtered water produced. Water-on-water systems do not require a source of compressed air, and thus can have smaller size and space requirements. These and other advantages of water-on-water systems make water-on-water systems an advantageous technical field for implementation of the inventive principles disclosed herein.

Some other types of filtration systems have some of the same shortcomings as to water-on-air systems. For example, tankless filtration systems utilize a large filtering member that has capacity to produce a relatively large amount of filtered water. Large filtering members can be costly and require significant space. Also, in order to maximize production of filtered water, the pressure drop across the filtering member must be increased, resulting in a low output pressure on the delivery side of the tankless water-on-water system.

Figure 1:
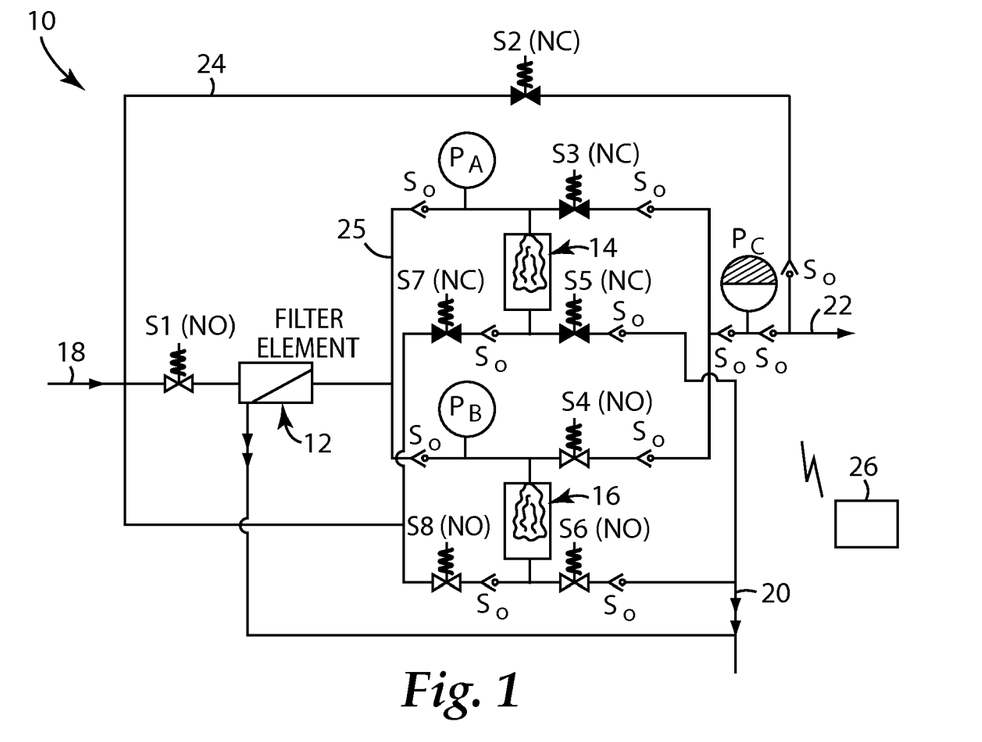
FIG. 1 is a schematic diagram illustrating features of an example filtration system according to principles of the present disclosure.
Figure 2:
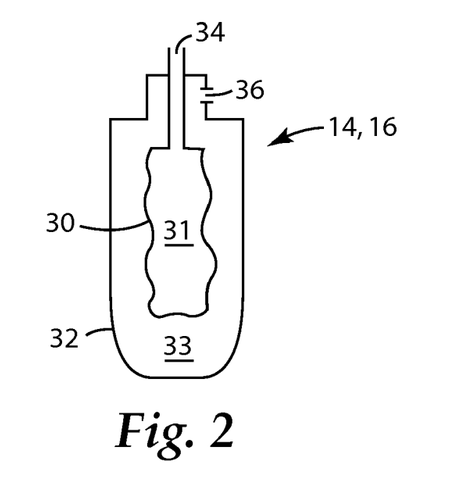
FIG. 2 is a schematic cross-sectional view of the an example water-on-water storage vessel used in association with the filtration system shown in FIG. 1.
Figure 3:
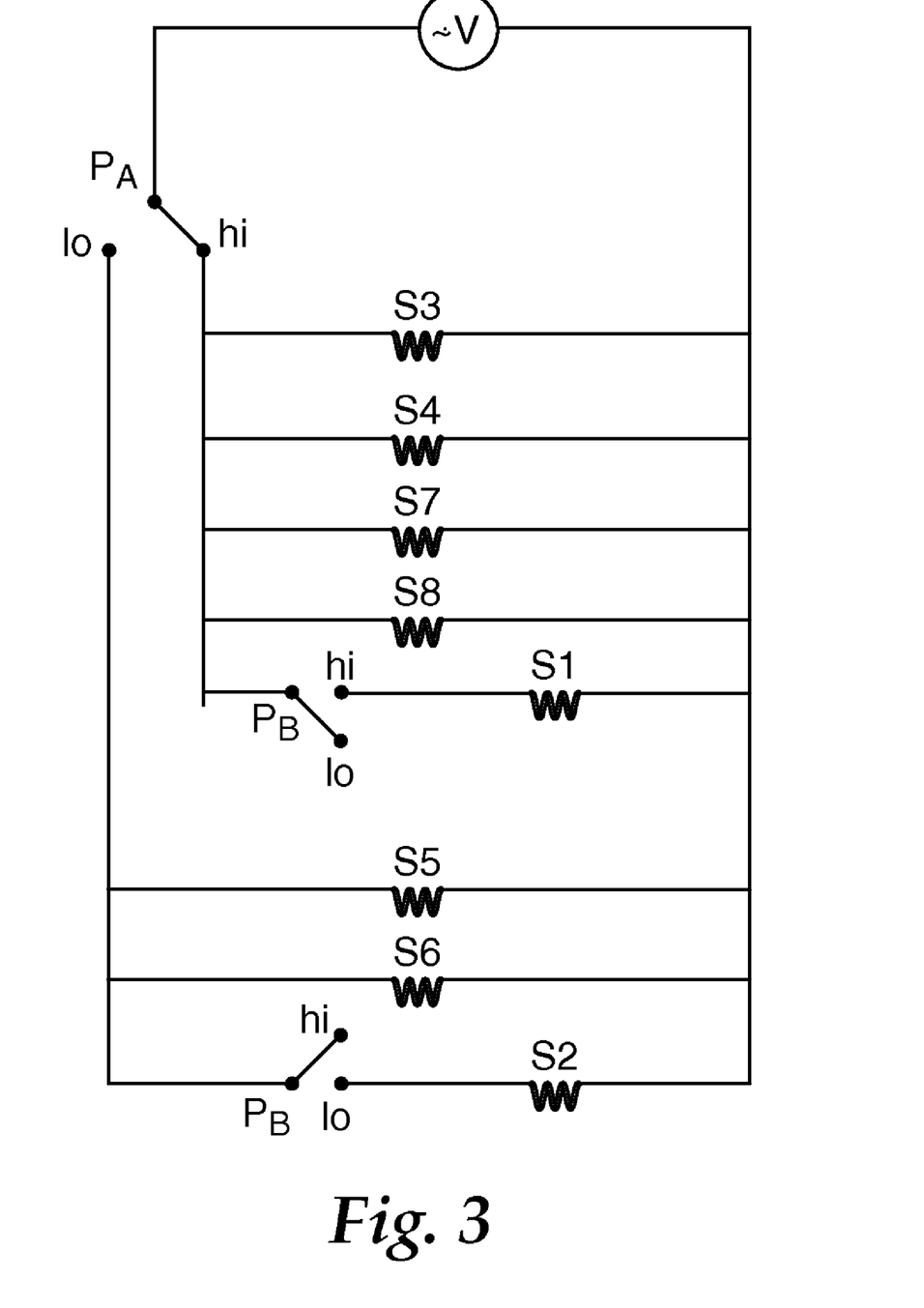
FIG. 3 is a schematic circuit diagram illustrating aspects of the filtration system shown in FIG. 1.

The Example System of FIGS. 1-3

An example filtration system 10 is now described with reference to FIGS. 1-3. Filtration system 10 includes a filtering member 12, first and second water-on-water storage vessels 14, 16, a feed line 18, a drain line 20, a service or output line 22, a by-pass line 24 and a tank line 25. The filtration system 10 also includes first and second pressure sensors $P_A$, $P_B$, a hydraulic accumulator $P_C$ (e.g., a hydropneumatic tank), a plurality of one-way valves $S_O$, and a plurality of control valves S1-S8.

The feed line 18 is connected in fluid communication with the filtering member 12 and a delivery side of each of the first and second storage vessels 14, 16. The drain line 20 is connected in fluid communication with the filtering member 12 and the delivery side of each of the first and second storage vessels 14, 16. The service or output line 22 is connected in fluid communication with a fill or filtered water side of the first and second storage vessels 14, 16 as well as the by-pass line 24. The by-pass line 24 is connected in fluid communication with the feed line 18 and the service line 22 so as to bypass the filter member 12 and first and second storage vessels 14, 16 under certain circumstances described below. The tank line 25 is connected in fluid communication with the filtering member 12 and the first and second storage vessels 14, 16.

Referring to FIG. 2, each of the first and second storage vessels 14, 16 includes a first container 30, a second container 32, a first input/output opening 34 in fluid communication with the first container 30, and a second input/output opening 36 in fluid communication with the second container 32. The first container 30 is shown as a flexible bag member (also referenced as a bladder) that defines a filtered water space 31. The second container, also referred to as an outer container defines a delivery water space 33.

The pressure sensors $P_A$, $P_B$ monitor a pressure condition in the filtered water storage space 31 and/or in the line that is connected in fluid communication with the space 31 (i.e., the line delivering filtered water from the filter member 12 to the first storage vessel 14 or the line that delivers filtered water from the first storage vessel to the service line 22).

The filtration system 10 also includes a control system 26 that is electrically connected to the pressure sensors $P_A$, $P_B$, the valves S1-S8, and other controllable features of the filtration system 10. The control system 26 controls opening and closing the valves S1-S8 in response to pressure signals received from the pressure sensors $P_A$, $P_B$, and other signals received from other features of the filtration system or an outside system (e.g., a signal representing demand for flow at the output line 22). The valves S1-S8 are usually maintained in either a normally open (NO) state or a normally closed (NC) state, as shown in FIG. 1, until a change in system pressure is confirmed by the pressure sensors $P_A$, $P_B$. FIG. 1 illustrates valves S1, S4, S6 and S8 as normally open, and valves S2, S3, S5 and S7 as normally closed. When a normally open valve is actuated (e.g., with an electronic stimulus from the control system 26), the normally open valve changes from an open state to a closed state. Likewise, when a normally closed valve is actuated, the normally closed valve changes from a closed state to an open state.

The filtration system 10 is typically triggered from the first pressure sensor $P_A$ that monitors the pressure of the filtered water in first container 30 of the first storage vessel 14. When this pressure is sensed at a predetermined low level, the valves S1-S8 are set in such a way that filtered water from the filtering member 12 is delivered to the first storage vessel 14 and stored in the first container 30. The opposite side of storage vessel 14 (the second container 32) is concurrently open to drain, preferably at atmospheric pressure. Further, the second container 32 of the second storage vessel 16 is concurrently open to receive feed water from the feed line 18 that compresses the first container 30 of the second storage vessel 16 to expel filtered water from the second storage vessel 16 to the hydraulic accumulator PC and ultimately to the service line 22. Because the second container 32 of the second storage vessel 16 is filled at the pressure of water in the feed line 18 (i.e., feed pressure), water is expelled from the first container 30 at the feed pressure.

Once the first container 30 of the first storage vessel 14 is filled to a predetermined level, the pressure sensor PA senses a predetermined high pressure level. The control system 26 responds to a high pressure signal from the pressure sensor PA by resetting the valves S1-S8 in such a way that the flow into and out of the first and second storage vessels 14, 16 is switched to fill the first container 30 of the second storage vessel 16 and expel filtered water from the first container 30 of the first storage vessel 14 (i.e., first storage vessel 14 in a service state and second storage vessel 16 in a fill state).

Filtered water is expelled from the first container 30 of the first storage vessel 14 by opening the flow path to the service line 22 and filling the second container 32 of the first storage vessel 14 with water from the feed line 18, thereby compressing the first container 30. Concurrently therewith, the first container 30 of the second storage vessel 16 is filled with filtered water delivered from the filtering member 12 while the second container 32 of the second storage vessel 16 is open to the drain line 20, preferably at atmospheric pressure. Once the first container 30 of the first storage vessel 14 is emptied (i.e., the predetermined low level is sensed by pressure sensor $P_A$), the cycle is restarted again and the first and second storage vessels are switched to be in the fill mode or state and the service or dispense mode or state, respectively.

The pressure sensor $P_B$ of the second storage vessel 16 works in conjunction with the first pressure sensor $P_A$ and the control system 26 to make sure that if both of the vessels 14, 16 are empty (i.e., the predetermined high pressure level has not been sensed), the valve S2 in the bypass line 24 is open so that water from the feed line 18 can be delivered to the service or output line 22 to meet the requested demand for water. If both of the first and second vessels 14, 16 are full (i.e., the predetermined high pressure level has been met for both vessels), the valve S1 is closed to stop operation of the filtering member 12, which can reduce the waste of water to drain line 20 coming from the filtering member 12.

Figure 4:
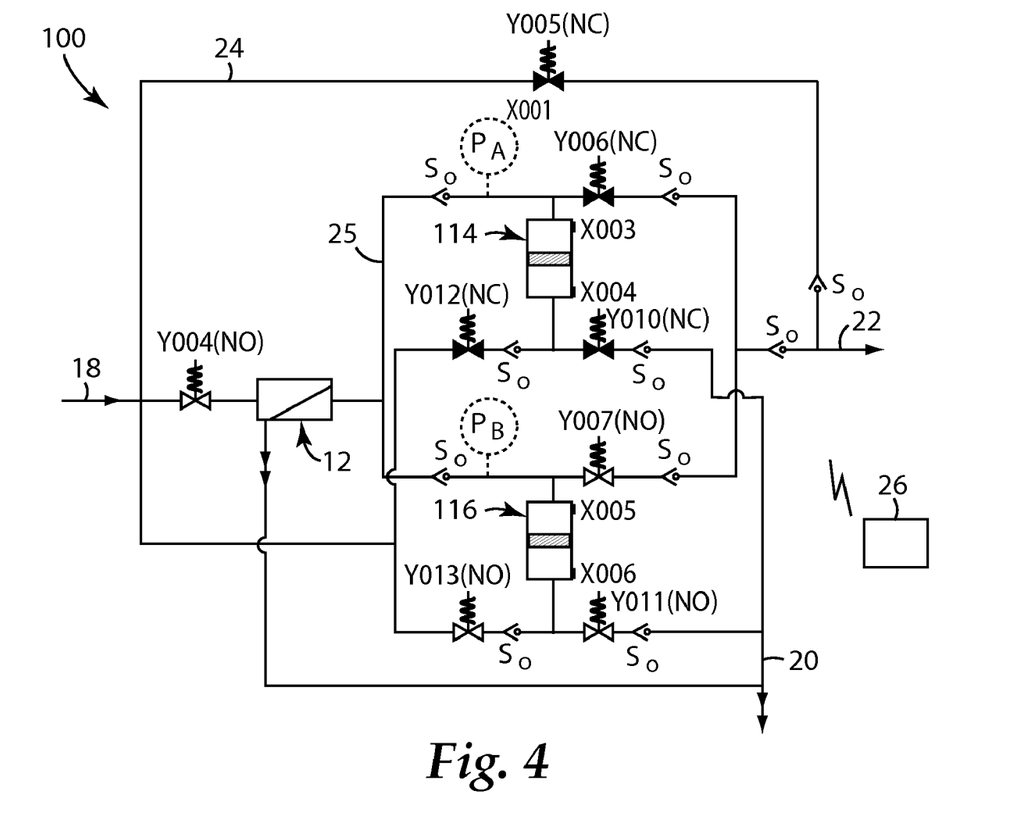
FIG. 4 is a schematic diagram illustrating features of another example filtration system in accordance with principles of the present disclosure.

In another example configuration, the output flow from the filtration system 10 via the service line 22 was not controlled by a hydraulic accumulator $P_C$ or any other flow control member. Instead, the service line 22 was left open to atmosphere or to the downstream pressure conditions of demanding water from the filtration system 10. When the hydraulic accumulator $P_C$ is removed, the pressure settings for the feed line 18 as well as the high and low pressure settings for the first and second pressure sensors $P_A$, $P_B$ can be modified to provide improved stability of the filtration system 10 depending on the demand conditions for water from the filtration system 10. The filtration system 100 described below with reference to FIG. 4 illustrates a service line 22 without a hydraulic accumulator or other flow control member at the output of the system.

One example setup for the filtration system 10 includes a one gallon per minute (gpm) flow control valve S1 that substantially matches the output of the filtering member 12 (e.g., a reverse osmosis filtering module having a capability of 1 gpm). The feed pressure in feed line 18 is regulated to about 60 psi, and the high and low predetermined pressure settings for the first and second pressure sensors $P_A$, $P_B$ are set at 55 psi and 45 psi, respectively. The filtered water delivered at the service line 22 at the output of the filtration system 10 was controlled to about 0.5 gpm by the hydraulic accumulator $P_C$. Any of these settings can be modified depending on any number of changes to the features, functionality, supply and demand related to the filtration system.

FIG. 3 illustrates an example circuit diagram related to the control of the plurality of valves S1-S8 conducted by the control system 26. FIG. 3 illustrates that when the first pressure sensor $P_A$ is at the high pressure setting, the valves S3, S4, S7, S8 are actuated and the valves S5, S6 are not actuated. Depending on the high or low state of the second pressure sensor $P_B$ while the first pressure sensor $P_A$ is in the high state, the first valve S1 may be open to provide a source of feed water to the filtering member 12 as described above.

When the first pressure sensor $P_A$ is at a low pressure setting or state, the valves S3, S4, S7, S8 are not actuated and the valves S5, S6 are actuated. According to the diagram shown in FIG. 3, the first pressure sensor $P_A$ is the dominant sensor that controls when the system switches the first and second storage vessels 14, 16 between fill and service states. In other arrangements, the second pressure sensor $P_B$ could be the dominant sensor. In still further arrangements, the sensors $P_A$, $P_B$ are treated equally by the control system so that when the pressure sensors are in one of the high or low states for a given vessel, the control system switches between fill and service for the vessels based on feedback from both sensors $P_A$, $P_B$.

The valves S1-S8 can comprise a variety of valve or regulator types. In one example, valve S1 is a solenoid valve (e.g., a latching solenoid) that is switched to and maintains an open state or a closed state upon application of a short electronic stimulus. In another example, any one of valves S1-S8 may be a pressure regulator that maintains an open state or a closed state dependent upon a hydraulic stimulus.

Figure 5:
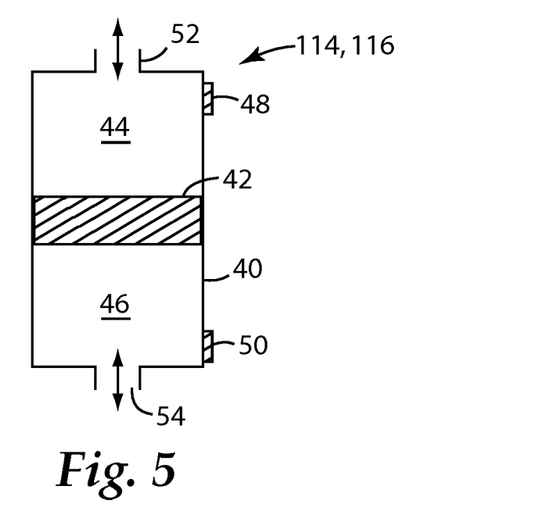
FIG. 5 is a schematic cross-sectional side view of another example water-on-water storage vessel used in association with the filtration system shown in FIG. 4.
Figure 6A:
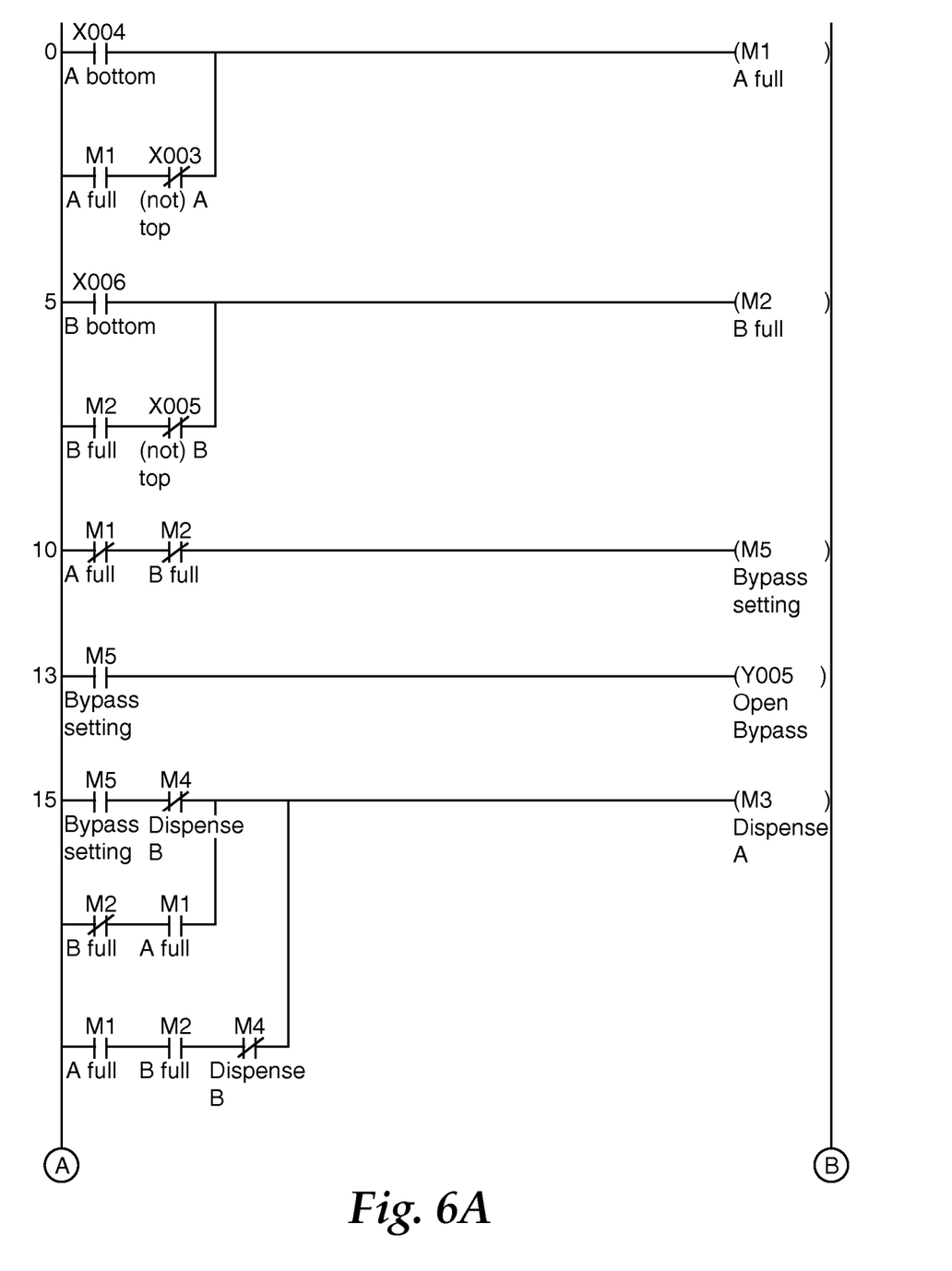
FIG. 6 is a ladder logic table of a software program used to control the filtration system shown in FIG. 4.
Figure 6B:
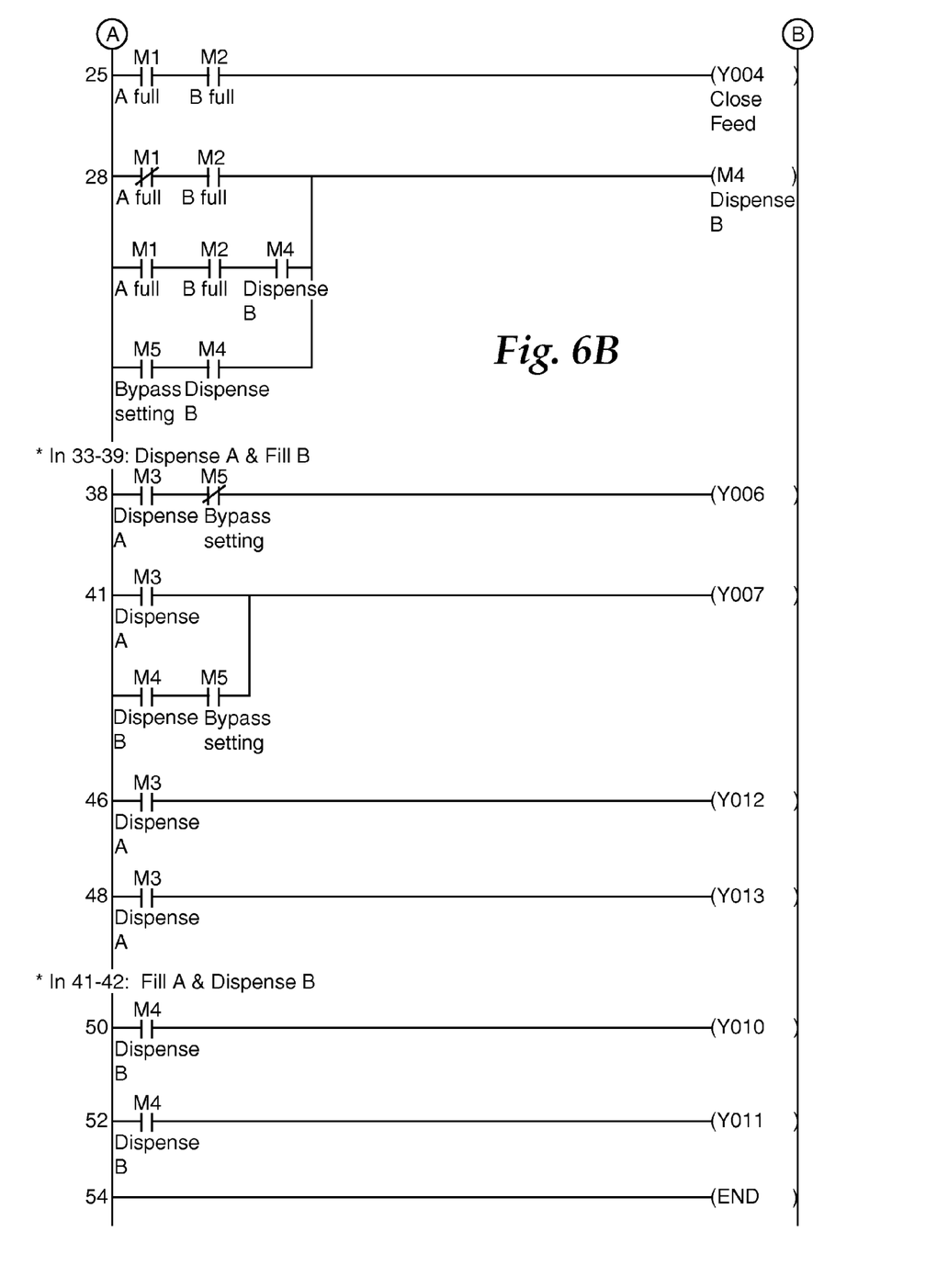

The Example Filtration System of FIGS. 4-6

Referring now to FIGS. 4-6, another example filtration system 100 is shown and described. Filtration system 100 includes many of the same or similar features as described above with reference to filtration system 10. Filtration system 100 includes a filtering member 12, first and second water-on-water storage vessels 114, 116, a feed line 18, a drain line 20, a service or output line 22, a bypass line 24, and a plurality of one-way valves $S_O$. The filtration system 100 also includes a plurality of valves Y004-Y007 and Y010-Y013, and a control system 26 that controls a plurality of valves Y004-Y007 and Y010-Y031.

The first and second storage vessels 114, 116 are piston style storage vessels that utilize sensors to determine the location of a piston in the vessel, which can be used to understand a fill state of the vessel (see FIG. 5). Some example sensors for use with the storage vessels 114, 116 magnetic proximity sensors, limit switches, level switches, reed switches, and position sensors such as linear encoder, optical and sonar position sensors.

FIG. 5 illustrates an example construction for the storage vessels 114, 116. The storage vessel include a container 40, a piston member 42 movable within the container 40 and dividing the container 40 into a filtered water space 44 and a delivery water space 46. A first position sensor 48 is positioned at a first end of the container 40 and a second position sensor 50 is positioned at an opposing second end of the container 40. Sensor signals from the position sensors 48, 50 are labeled as X003-X006 in FIG. 4 and the ladder logic program illustrated in FIG. 6. The container 40 includes first and second inlets/outlets 52, 54 positioned at opposing ends of the container 40. The position sensors 48, 50 track the position of the piston 42 within the container 40 thereby providing information about the fill state (i.e., full or empty from the filtering member 12) of the storage vessels 114, 116.

The control system 26 takes inputs from the first and second position sensors 48, 50 to control the open and closed state of the plurality of valves Y004-Y007 and Y010-Y013 in accordance with the PCL ladder logic shown in FIG. 6. Output from the position sensors 48, 50 are represented as X003, X004 for the first storage vessel 114, and X005, X006 for the second storage vessel 116. The filtration system 100 can also include first and second pressure sensors $P_A$, $P_B$ positioned in the line between the filtering member 12 and the first and second storage vessels 114, 116, respectively. The first and second pressure sensors $P_A$, $P_B$ can provide additional feedback to the control system 26 to confirm a fill state of the first and second storage vessels 114, 116. The pressure sensors $P_A$, $P_B$ are labeled as inputs X001 and X002, respectively in the logic diagram shown in FIG. 6.

The following general definitions relate to terms used in the diagrams of FIGS. 4 and 6:
  Xxxx: Input variables from proximity sensors or optional pressure switches.
  Yxxx: Output relay to solenoid valves.
  Mxxx: Internal relay value used to keep track of additional values in the system.

Alternative Examples

One aspect of the examples described above with reference to FIGS. 1-6 relates to the integrated nature of the control system for controlling when each of the storage vessels is in either a fill or service mode. The systems described above include a single filtering member that feeds two separate storage vessels, and the storage vessels deliver filtered water to a single output. In another arrangement, two separate water filtration systems are connected to a single output or service line, wherein each water filtration system includes a single storage vessel and a separate filtering member. A similar control system that integrates control over the valves as described above with reference to FIGS. 1-6 could be used to control the fill and service states of the storage vessels in each of the filtration systems to provide the desired output of filtered water. The use of an integrated control system could then, in a similar fashion to those examples described with reference to FIGS. 1-6, place one of the filtration systems in a service mode while the other filtration system is in a fill mode and switch between the two modes to provide a relatively constant output of filtered water at substantially the same of production while still using less space than some other known filtration systems that attempt to provide constant output of filtered water.

In a further alternative example, the example systems described with reference to FIGS. 1-6 are modified to include three or more storage vessels. The control system can be configured to maximize efficiency of production, storage, and delivery of filtered water using all of the storage tanks.

The filtration systems disclosed herein can utilize any number of different filtering members and filtering technologies. In one example, a filtration system can include two or more filtering members (e.g., filtering member 12 shown in FIG. 1) arranged in series or in parallel, and that are connected in fluid communication with the storage vessels (e.g., vessels 14, 16) through a tank line (e.g., tank line 25). Some example filtering technologies that are possible include reverse osmosis, nano filtration, ultra filtration and other filtration systems that help remove impurities from the water. It is also possible to add supplements to the water in addition to, or in place of, filtering the water using the example systems described herein. In one example, a bypass line around the filtering member can be added to the example filtration systems. Flow of source water through the bypass line can be adjusted by the user to provide a customized mix of filtered and unfiltered water that is stored in the storage vessels.

Conclusion

One aspect of the present disclosure relates to a filtration system that includes at least one water filtration member, first and second water-on-water vessels, a plurality of valve members, and a control system. The first water-on-water vessel is fluidly connected to the filtration member and configured to alternate between a service state and a fill state. The second water-on-water vessel is also fluidly connected to the filtration member and configured to alternate between a service state and a fill state. The control system is configured to control the plurality of valve members to switch between service and fill states for the first and second vessels. The filtration member can be a reverse osmosis filter.

Another aspect of the present disclosure relates to a filtration system that includes at least one reverse osmosis water filtration member, first and second vessels, a plurality of valve members, and a control system. The first vessel is fluidly connected to the filtration member and configured to alternate between a service state and a fill state. The first vessel includes first and second water containers, wherein the first water container has a compressible portion that is positioned within the second container and is configured to retain filtered water received from the filtration member. The second vessel is fluidly connected to the filtration member and configured to alternate between a service state and a fill state. The second vessel includes first and second water containers, wherein the first water container of the second vessel has a compressible portion that is positioned within the second container of the second vessel and is configured to retain filtered water received from the filtration member. The plurality of valve members are in fluid communication with the filtration member and the first and second vessels. The control system is configured to control the plurality of valve members to switch the first and second vessels between service and fill states.

A further aspect of the present disclosure relates to a method of delivering filtered water with a water filtration system. The water filtration system includes at least one filtering member, first and second water-on-water storage vessels, a plurality of valves, and a control system. The first and second storage vessels are each configured to alternate between a fill state wherein the storage vessel is filled with filtered water, and a service state wherein filtered water is expelled from the storage vessel. The method includes steps of generating a supply of filtered water with the filtering member, controlling the plurality of valves with the control system to set the first storage vessel in a fill state and the second storage vessel in a service state, and controlling the plurality of valves with the control system to set the first storage vessel in a service state and the second storage vessel in a fill state.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment. Therefore, the sphere and scope of the appended claims should not be limited to the description of the preferred versions contained herein.

We claim:
1. A filtration system, comprising:
  at least one reverse osmosis filtration member connected to a feed line, a tank line, and a drain line;
  an output line to deliver an output flow from the filtration system;
  first and second water-on-water vessels each configured to alternate between a service state and a fill state such that when the first water-on-water vessel is in the fill state, the second water-on-water vessel is in the service state, and when the second water-on-water vessel is in the fill state, the first water-on-water vessel is in the service state, each water-on-water vessel comprising a first container and a second container; wherein, for each vessel:
  in the service state, the first container is fluidly connected to the output line while the second container is fluidly connected to the feed line; and
  in the fill state, the first container is fluidly connected to the tank line while fluid in the second container is fluidly connected to the drain line;
a plurality of valve members; and
a control system configured to control the plurality of valve members to switch between service and fill states for the first and second vessels.

2. The filtration system of claim 1, wherein the system further includes a bypass line coupled in fluid communication with the feed line and the output line and configured to bypass the filtration member and the first and second water-on-water vessels.

3. The filtration system of claim 1, wherein each first water container comprises a compressible portion, the first water container being positioned within the second water container.

4. The filtration system of claim 1, wherein the first and second water-on-water vessels each include a piston movably positioned therein, the piston dividing the water vessel into a filtered water storage space and a delivery water storage space.

5. The filtration system of claim 1, wherein the control system control the plurality of valve members to provide only one of the first and second vessels in a service state at any given time.

6. The filtration system of claim 1, wherein the control system controls the plurality of valve members to automatically switch between service and fill states for the first and second vessels when one of the first and second vessels is in an empty state.

7. The filtration system of claim 3, wherein the first water container is configured to retain filtered water received from the filtration member.

8. The filtration system of claim 7, wherein the service state of the first and second vessel includes an arrangement of the plurality of valves in which the second water container is filled with water to compress the first water container thereby expelling filtered water from the vessel.

9. The filtration system of claim 1, further comprising a pressure sensor associated with each of the first and second vessels, the pressure sensors configured to monitor water pressure and generate a pressure signal used by the control system to determine when to alternate between the service and fill states.

10. A method of delivering filtered water with a water filtration system, the water filtration system including at least one reverse osmosis filtering member connected to a feed line, a tank line, and a drain line, an output line to deliver an output flow from the filtration system, first and second water-on-water storage vessels, a plurality of valves, and a control system, the first and second storage vessels each being configured to alternate between a fill state wherein the storage vessel is filled with filtered water and a service state wherein filtered water is expelled from the storage vessel such that when the first storage vessel is in the fill state, the second storage vessel is in the service state, and when the second storage vessel is in the fill state, the first storage vessel is in the service state, each storage vessel comprising a first container and a second container, wherein for each vessel: in the service state, the first container is fluidly connected to the output line while the second container is fluidly connected to the feed line; and in the fill state, the first container is fluidly connected to the tank line while fluid in the second container is fluidly connected to the drain line, The method comprising:
  Generating a supply of filtered water with the filtering member;
  Controlling the plurality of valves with the control system to set the first storage vessel in a fill state and the second storage vessel in a service state; and
  Controlling the plurality of valves with the control system to set the first storage vessel in a service state and the second storage vessel in a fill state.

11. The method of claim 10, wherein the first storage vessel is set in the fill state when the second storage vessel is set in the service state, and the second storage vessel is set in the fill state when the first storage vessel is set in the service state.

12. The method of claim 10, wherein the filtration system further includes a hydraulic accumulator and an output line of the filtration system, the output line connected in fluid communication with the filtered water outputs of each of the first and second vessels.

13. The method of claim 10, wherein the filtration system further includes a drain water outlet, the drain water outlet being connected in fluid communication with the a drain outlet of each of the first and second vessels and the filtration member, the method further comprising draining water from the filtration system.

14. The method of claim 13, wherein the first and second vessels each including a movable separating member that divides the vessel into a filtered water storage space and a delivery water storage space, wherein in the fill mode the filtered water storage space is filled with the supply of filtered water and the delivery water storage space is drained to atmospheric pressure, and in the service mode the delivery water storage space is filled with water to move the movable separating member thereby expelling the filtered water stored in the filtered water storage space at a predetermined pressure level.

* * * * *

UNITED STATES PATENT AND TRADEMARK OFFICE
CERTIFICATE OF CORRECTION

| | |
|---|---|
| PATENT NO. | : 8,257,594 B2 |
| APPLICATION NO. | : 12/027377 |
| DATED | : September 4, 2012 |
| INVENTOR(S) | : Robert E Astle |

It is certified that error appears in the above-identified patent and that said Letters Patent is hereby corrected as shown below:

<u>Column 2</u>
Line 18, after "of" delete "the".

<u>Column 6</u>
Line 34, delete "Y010-Y031." and insert -- Y010-Y013. --, therefor.

<u>Column 10</u>
Line 17, in Claim 10, delete "The" and insert -- the --, therefor.
Line 18, in Claim 10, delete "Generating" and insert -- generating --, therefor.
Line 20, in Claim 10, delete "Controlling" and insert -- controlling --, therefor.
Line 23, in Claim 10, delete "Controlling" and insert -- controlling --, therefor.
Line 37, in Claim 13, after "the" delete "a".

Signed and Sealed this
Twenty-seventh Day of November, 2012

David J. Kappos
*Director of the United States Patent and Trademark Office*